United States Patent
Balasubramanian et al.

(10) Patent No.: US 9,531,804 B2
(45) Date of Patent: *Dec. 27, 2016

(54) OPTIMIZING RESOURCE DOWNLOADS OR STREAMS USING A COLLECTION OF TRUSTED NETWORK CONNECTED ENDPOINTS

(71) Applicant: International Business Machines Corporation, Armonk, NY (US)

(72) Inventors: Swaminathan Balasubramanian, Southfield, MI (US); Radha M. De, West Bengal (IN); Ashley D. Delport, Ballito (ZA); Saswati Maji, Kolkata (IN); Indrajit Poddar, Sewickley, PA (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/178,266

(22) Filed: Jun. 9, 2016

(65) Prior Publication Data

US 2016/0277493 A1    Sep. 22, 2016

Related U.S. Application Data

(63) Continuation of application No. 15/012,605, filed on Feb. 1, 2016, now Pat. No. 9,420,041, which is a
(Continued)

(51) Int. Cl.
*H04L 29/08* (2006.01)
*H04L 12/26* (2006.01)
(Continued)

(52) U.S. Cl.
CPC .......... *H04L 67/1085* (2013.01); *H04L 43/16* (2013.01); *H04L 67/34* (2013.01); *G06F 21/10* (2013.01); *H04L 12/18* (2013.01)

(58) Field of Classification Search
CPC .... G06Q 30/06; G06Q 30/0283; G06Q 50/01; H04L 67/104
See application file for complete search history.

(56) References Cited

U.S. PATENT DOCUMENTS 8,280,958 B2   10/2012   Chavez et al.
8,370,420 B1    2/2013   Decasper et al.
(Continued)

FOREIGN PATENT DOCUMENTS

WO       0217140 A2      2/2002
WO    2011121269 A1    10/2011

OTHER PUBLICATIONS

IBM, "System and Method for Optimized Mail Attachment Download", An IP.com Prior Art Database Technical Disclosure, IP.com No. 000168598, Mar. 18, 2008, http://ip.com/IPCOM/000168598.
(Continued)

*Primary Examiner* — Barbara Burgess
(74) *Attorney, Agent, or Firm* — Maeve Carpenter

(57) ABSTRACT

In an approach to improving resource downloads, one or more computer processors detect a request to download a resource from an original source to a user's computing device. The one or more computer processors determine a cost of the download of the requested resource from the original source. The one or more computer processors determine whether the cost of the download of the requested resource from the original source exceeds a predefined threshold. The one or more computer processors determine a group of trusted network connected endpoints. The one or more computer processors determine whether the requested resource exists in the group of trusted network connected endpoints. Responsive to determining the requested resource exists in the group of trusted network connected endpoints,
(Continued)

the one or more computer processors download the requested resource from at least one of the trusted network connected endpoints.

1 Claim, 3 Drawing Sheets

Related U.S. Application Data continuation of application No. 14/501,999, filed on Sep. 30, 2014.

(51) Int. Cl.
*G06F 21/10* (2013.01)
*H04L 12/18* (2006.01)

(56) References Cited

U.S. PATENT DOCUMENTS

| | | |
|---|---|---|
| 8,520,535 B2 | 8/2013 | Dawson et al. |
| 8,601,512 B2 | 12/2013 | Chang et al. |
| 8,639,781 B1 | 1/2014 | Motes et al. |
| 2006/0259957 A1* | 11/2006 | Tam .................. G06F 21/10 726/3 |
| 2010/0144330 A1 | 6/2010 | Ahlin |
| 2014/0115116 A1 | 4/2014 | Motes et al. |
| 2015/0127715 A1* | 5/2015 | Dankberg .......... H04L 67/2857 709/203 |

OTHER PUBLICATIONS

"GAIAN Database", IBM, downloaded on Jun. 11, 2014, <https://www.ibm.com/developerworks/community/groups/service/html/communityview?communityUuid=f6ce657b-f385-43b2-8350-458e6e4a344f>.

U.S. Appl. No. 15/012,605, filed Feb. 1, 2016.

U.S. Appl. No. 14/501,999, filed Sep. 30, 2014.

List of IBM Patents or Patent Applications Treated as Related (Appendix P), filed herewith.

* cited by examiner

OPTIMIZING RESOURCE DOWNLOADS OR STREAMS USING A COLLECTION OF TRUSTED NETWORK CONNECTED ENDPOINTS

BACKGROUND OF THE INVENTION

The present invention relates generally to the field of data processing, and more particularly to downloading digital resources.

Computer networks, for example, the Internet, provide information and contents which can be accessed via the network. Various types of files, such as program files, music files (e.g., MP3-files), or video files, can be downloaded via the Internet and then executed, for example, on a computing device to which the respective file was downloaded.

Peer-to-peer (P2P) computing or networking is a distributed application architecture that partitions tasks or workloads between peers. Peers are equally privileged, equipotent participants in the application, forming a peer-to-peer network of nodes. Peers make a portion of their resources, such as processing power, disk storage or network bandwidth, directly available to other network participants, without the need for central coordination by servers or stable hosts. Peers are both suppliers and consumers of resources, in contrast to the traditional client-server model in which the consumption and supply of resources is divided. Emerging collaborative P2P systems are going beyond the era of peers doing similar things while sharing resources, and are looking for diverse peers that can bring in unique resources and capabilities to a virtual community thereby empowering it to engage in greater tasks beyond those that can be accomplished by individual peers, yet that are beneficial to all the peers.

SUMMARY

Embodiments of the present invention disclose a method, a computer program product, and a system for improving resource downloads. The method for improving resource downloads can include one or more computer processors detecting a request to download a resource from an original source to a user's computing device. The one or more computer processors determine a cost of the download of the requested resource from the original source. The one or more computer processors determine whether the cost of the download of the requested resource from the original source exceeds a predefined threshold. The one or more computer processors determine a group of trusted network connected endpoints. The one or more computer processors determine whether the requested resource exists in the group of trusted network connected endpoints. Responsive to determining the requested resource exists in the group of trusted network connected endpoints, the one or more computer processors download the requested resource from at least one of the trusted network connected endpoints.

DETAILED DESCRIPTION

Computer users often download resources from remote servers without considering that the downloaded resource, such as a file, may already exist on the user's device. The downloaded resource can also exist on devices within a collection of trusted network connected endpoints, for example, devices belonging to friends in a social network that are in close proximity and can provide a better network path for downloading. Users tend to download resources directly from the source server because of the difficulty of searching for the same resource elsewhere, which can result in high bandwidth utilization at the server and additional time spent downloading.

Embodiments of the present invention recognize that efficiency can be gained by implementing a method to determine the best path to download a resource. Efficiency can also be gained by converting a client/server request for downloading a resource to an ad hoc immediate or scheduled peer-to-peer request by using a collection of trusted network connected endpoints, such as corporate or social networks. Implementation of embodiments of the invention can take a variety of forms, and exemplary implementation details are discussed subsequently with reference to the Figures.

Figure 1:
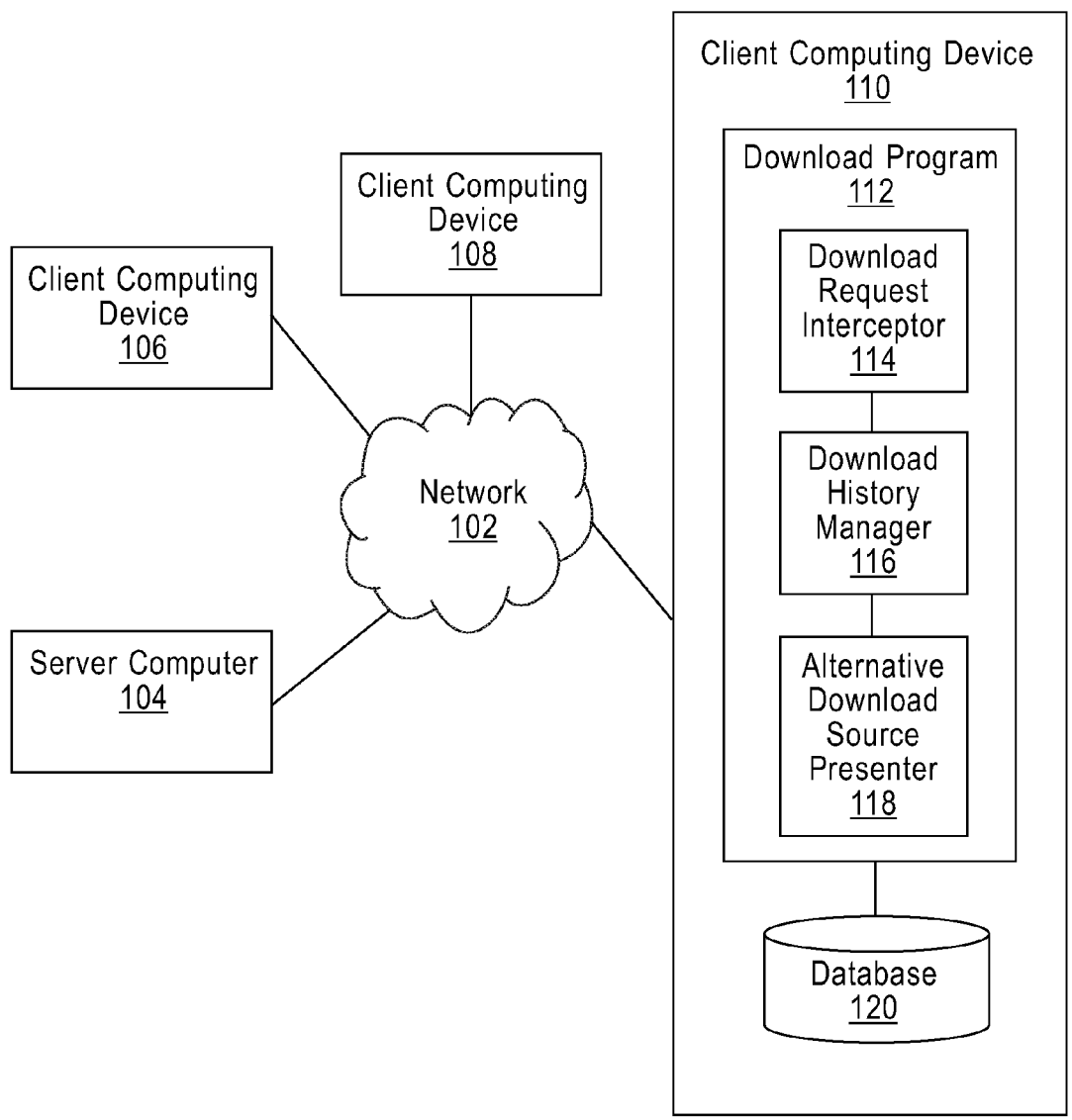
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments can be implemented. Many modifications to the depicted environment can be made by those skilled in the art without departing from the scope of the invention as recited by the claims.

Distributed data processing environment 100 includes server computer 104 and client computing devices 106, 108, and 110, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information.

Server computer 104 can be a management server, a web server, or any other electronic device or computing system capable of receiving and sending data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing devices 106, 108, and 110 via network 102. In another embodiment, server computer 104 represents a computing system utilizing clustered computers and components to act as a single pool of seamless resources. In one embodiment, server computer 104 includes one or more social networks. In another embodiment, one or more social networks can exist as separate components of distributed data processing environment 100 (not shown).

Each of client computing devices 106, 108, and 110 can be a desktop computer, a laptop computer, a tablet computer, a specialized computer server, a personal digital assistant (PDA), a smart phone, or any programmable electronic device capable of communicating with server computer 104, as well as with each other, via network 102 and with various components and devices within distributed data processing environment 100. In general, client computing devices 106, 108, and 110 represent any programmable electronic device or combination of programmable electronic devices capable of executing machine readable program instructions and communicating with other computing devices via a network, such as network 102. Client computing device 110 includes download program 112 and database 120.

Download program 112 intercepts and converts a client/server request for resource download to an adhoc immediate or scheduled peer-to-peer request by using a collection of trusted network connected endpoints, such as devices belonging to friends in a social network. Download program 112 assumes that contacts made through a user's organization or social networks can be trusted. Download program 112 intercepts a user request from the user of client computing device 110 for a resource download from server computer 104. After download program 112 determines that the version of the resource has not been previously downloaded and that the cost of the download exceeds a threshold, download program 112 uses one or more social networks to find contacts available to source the resource. Download program 112 selects one or more optimum neighbors and converts the request into an immediate or scheduled peer-to-peer resource transfer. Download program 112 includes user download request interceptor 114, download history manager 116, and alternative download source presenter 118. Download program 112 is depicted and described in further detail with respect to FIG. 2.

Download request interceptor 114 intercepts a user's download request as soon as the user selects a resource for download. Download request interceptor 114 prompts the user to provide information such as email address, cell phone number, social network identification, and organization details, including the user's email address in the organization domain. Download request interceptor 114 also collects the IP address of the user's client computing device, such as client computing device 110. If client computing device 110 is a PDA, download request interceptor 114 automatically captures the PDA ID. Download request interceptor 114 can also capture an International Mobile Station Equipment Identity (IMEI) number if client computing device 110 is a mobile phone. Download request interceptor 114 stores the collected information in a database table, such as in database 120, for future reference. Download request interceptor 114 passes the collected information to download history manager 116.

Download history manager 116 retrieves historic information of previous resource downloads from the same source as the request and compares the information with the current user's identification information. Download history manager 116 approaches the historic information in a bottoms up manner. Download history manager 116 first tries to match the user's IP address with an entry in a list of historic IP addresses. If download history manager 116 finds a match, download history manager 116 recommends that the user check the user's system for the resource, as the user may have already downloaded the requested resource at an earlier time. If download history manager 116 does not find a match, download history manager 116 next tries to find a match in the user's organization domain and in the user's social network community and tries to find at least one contact that has downloaded the requested resource in the past. If download history manager 116 finds a list of suitable candidates, download history manager 116 passes the list to alternative download source presenter 118.

Alternative download source presenter 118 receives the list of downloads from download history manager 116, and prioritizes the list by feasibility of downloading the target resource with minimal bandwidth and time. The first priority is the user with same IP address, i.e., the requesting user has downloaded the same resource in the past. The next priority is a peer user that belongs to the same organization domain. The last priority, typically, is a user in the requesting user's social network. Alternative download source presenter 118 presents the list to the user. Alternative download source presenter 118 can also add flags to the list to indicate users that are currently online so that the requesting user can contact a peer immediately to obtain the resource.

Database 120 resides on client computing device 110. In another embodiment, database 120 can reside on client computing device 106 or 108, or elsewhere in the environment. A database is an organized collection of data. Database 120 can be implemented with any type of storage device capable of storing data that can be accessed and utilized by client computing device 110, such as a database server, a hard disk drive, or a flash memory. In other embodiments, database 120 can represent multiple storage devices within client computing device 110. Database 120 stores downloaded resources. Database 120 also stores identification information collected by download request interceptor 114.

Figure 2:
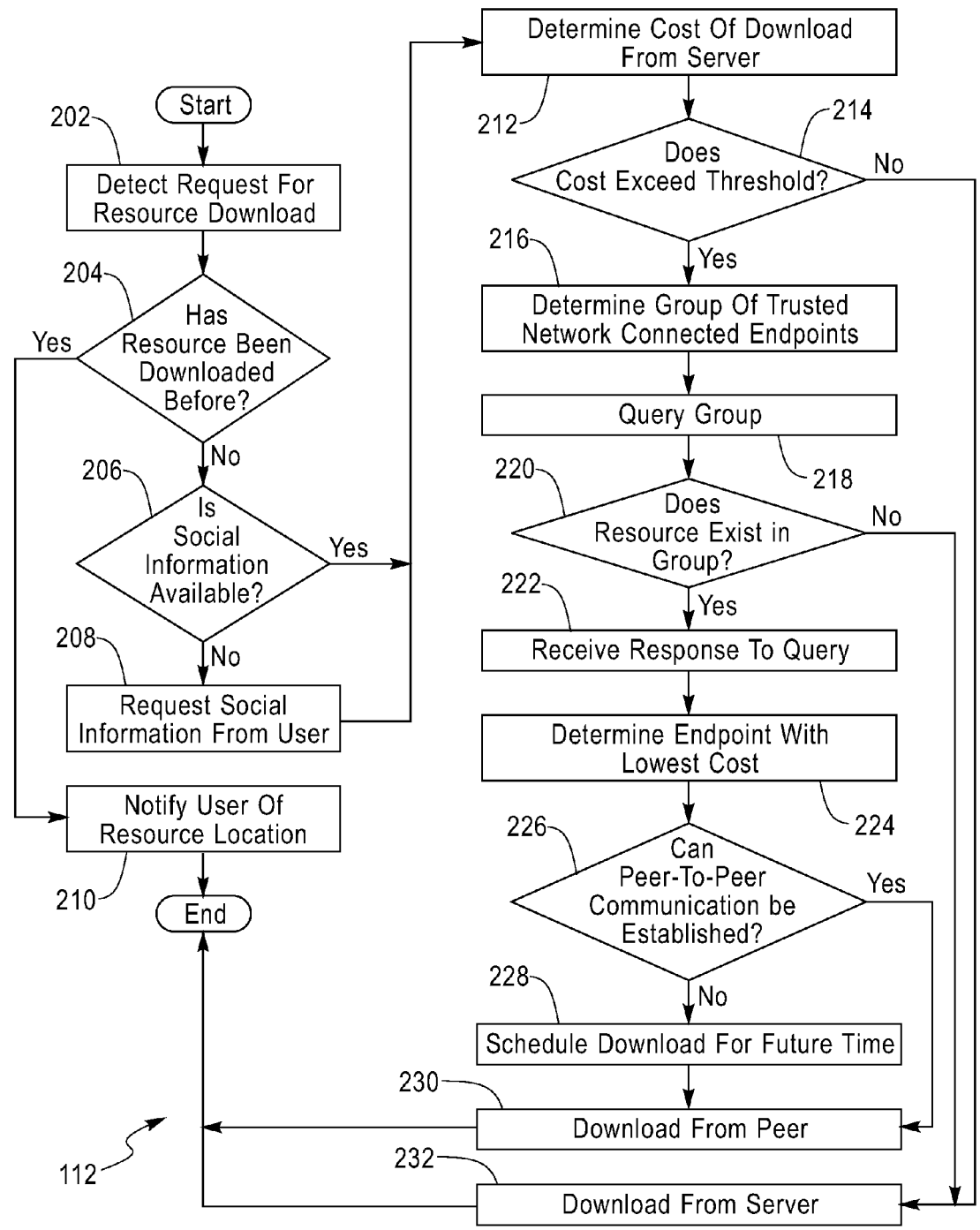
FIG. 2 is a flowchart depicting operational steps of a download program, on a client computing device within the distributed data processing environment of FIG. 1, for improving resource downloads, in accordance with an embodiment of the present invention.

FIG. 2 is a flowchart depicting operational steps of download program 112, on client computing device 110 within distributed data processing environment 100 of FIG. 1, for improving resource downloads, in accordance with an embodiment of the present invention.

Download program 112 detects a request for a resource download (step 202). Using download request interceptor 114, download program 112 detects the user's selection of a resource download and intercepts the request prior to the execution of the download by client computing device 110 from server computer 104.

Download program 112 determines whether the selected resource has been downloaded before (decision block 204). Using download history manager 116, download program 112 retrieves historic information of previous downloads, for example, the device download history, to determine whether the current version of the selected resource was downloaded to client computing device 110 in the past. If download program 112 determines that the requested resource was downloaded prior to the current request ("yes" branch, decision block 204), then download program 112 notifies the user of the resource location (step 210). Download program 112 notifies the user that the requested resource already resides on client computing device 110 and provides the user with the location address of the resource. Download program 112 also aborts the current download request.

If download program 112 determines that the requested resource has not been downloaded in the past ("no" branch, decision block 204), then download program 112 determines whether social information is available (decision block 206). Social information associated with the user can include social network IDs for networks such as Facebook®, LinkedIn®, Twitter®, etc. Social information associated with the user can also include contact information, organization email address, corporate chat ID, etc. Social information can be stored in database 120. If download program 112 determines that social information is not available ("no" branch, decision block 206), then download program 112 requests social information from the user (step 208). Download program 112 can prompt the user to input social information through a series of interactive questions. Download program 112 can also prompt the user to input social information by providing a form for the user to complete.

If the social information is available ("yes" branch, decision block 206) or if the user has provided the social information in step 208, download program 112 determines the cost of downloading the requested resource from a server, such as server computer 104 (step 212). The cost of the download can be measured by the amount of time or bandwidth required to download the resource from a particular source. The cost can also be measured by the size of the file. In addition, bandwidth and cost can be translated into a financial measurement.

Responsive to determining the cost of downloading the resource from server computer 104, download program 112 determines whether the cost of the download exceeds a predefined threshold (decision block 214). The download cost threshold can be predefined based on the measurement method. For example, if the measurement method is bandwidth, then the download cost threshold can be set to five Mbits/second. If, for example, the measurement method is time required to download the resource, then the download cost threshold can be set to five seconds. In one embodiment, the user sets the predefined threshold. In another embodiment, the organization can set the predefined threshold. If the cost of the download does not exceed the threshold ("no" branch, decision block 214), then download program 112 downloads the requested resource from server computer 104 (step 232), per the original request.

If download program 112 determines that the cost of the download does exceed the threshold ("yes" branch, decision block 214), then download program 112 determines a group of trusted network connected endpoints (step 216). The group of trusted network connected endpoints can include contacts from a plurality of sources. For example, the group of trusted network connected endpoints can be a friend list in a social network, such as Facebook® or LinkedIn®, or a set of Twitter® handles that the user has followed or interacted with at some predetermined frequency in the past. In another example, the group of trusted network connected endpoints can be obtained from a list of email and phone book contacts with a history of message exchanges in the past. In a further example, the group of trusted network connected endpoints can be obtained from a wireless device discovery protocol, such as Bluetooth®, for finding devices in physical proximity which allow themselves to be discovered and connected to. Users in the group of trusted network connected endpoints can include users of client computing devices 106 and 108. In one embodiment, download program 112 can prioritize the search for the group of trusted network connected endpoints by looking first in the user's organization domain for any user whose organization email ID matches that of the user. In one embodiment, the prioritization of the search groups is based on a program default. In another embodiment, the prioritization of the search groups can be based on user preference.

Download program 112 queries the group (step 218). In one embodiment, using download history manager 116, download program 112 sends a query message to the devices associated with the group of trusted network connected endpoints to determine whether any member of the group already has the requested resource, for example, client computing device 106 and client computing device 108.

Download program 112 determines whether the requested resource exists in the group (decision block 220). If download program 112 determines the requested resource does not exist in the group ("no" branch, decision block 220), then download program 112 downloads the requested resource from server computer 104 (step 232), per the original request. In one embodiment, if download program 112 determines the requested resource does not exist in the group, download program 112, using download history manager 116, can continue to search for another group of trusted network connected endpoints to which download program 112 can forward the query. The query can be propagated to a pre-configured depth across a social network of trusted network connected endpoints. For example, if the user of client computing device 110 is connected, via a social network, to a user of client computing device 106, then download history manager 116 determines whether the requested resource exists on client computing device 106. If download history manager 116 determines the resource is not on client computing device 106, then download history manager 116 can propagate the query to the social network of the user of client computing device 106. If the user of client computing device 106 is connected, via a social network, to a user of client computing device 108, then download history manager 116 determines whether the requested resource is on client computing device 108. This sequence continues through the pre-configured depth across the social network.

If download program 112 determines the requested resource does exist in the group ("yes" branch, decision block 220), then download program 112 receives a response to the query (step 222). If the requested resource exists in any of the trusted network connected endpoint devices, such as client computing device 106 or client computing device 108, download program 112 receives a response message from the one or more devices that have the requested resource. The message can be received through a plurality of possible network paths. For example, the message can be received through a special TCP/IP encapsulated packet, and SMS encapsulated message, a Bluetooth® response, or a local wifi connection. The received message can include metadata regarding the size of the resource, possible network paths, and protocol through which the resource can be transferred, for example, FTP, HTTP, SMS/MMS, email attachment, or Bluetooth® file transfer.

Download program 112 determines the endpoint with the lowest cost (step 224). Using alternative download source presenter 118, download program 112 lists the available sources from which the resource can be downloaded by lowest cost, i.e., lowest required bandwidth or time. In one embodiment, alternative download source presenter 118 can prioritize the list by users in the same domain, or peer users, followed by contacts in the requesting user's social network. In another embodiment, alternative download source presenter 118 can prioritize the list by users that are currently online, such that download program 112 can obtain the resource immediately. In one embodiment, download program 112 determines the cost of downloading the resource from each contact on the list by inspecting the information in the response packet and attempting a test connection to the source trusted endpoint to determine the current network bandwidth and path to the responding endpoint over the supported protocols specified in the response. In another embodiment, download program 112 can determine the cost of downloading the resource from each contact on the list by receiving an offer to initiate a connection by the trusted endpoint device for a specified cost. Download program 112 can evaluate the cost of receiving the resource via a push versus a pull model, and determine which method is faster. In one embodiment, more than one contact on the list can have the equivalent lowest cost of downloading.

Download program 112 determines whether peer-to-peer communication can be established (decision block 226). Download program 112 determines whether the peer-to-peer communication between client computing device 110 and the client computing device of the trusted network connected endpoint with the lowest cost of downloading the resource can be established. If download program 112 determines that peer-to-peer communication can be established ("yes" branch, decision block 226), then download program 112 converts the intercepted client/server download request to a peer-to-peer download request and downloads the resource from the peer client computing device (step 230). In one embodiment, if download program 112 finds multiple sources from which to download at the lowest cost, download program 112 can split the download across the multiple sources.

If download program 112 determines that peer-to-peer communication cannot be established ("no" branch, decision block 226), then download program 112 schedules the resource download for a future time (step 228). If communication cannot be established immediately but can be established in the future, then download program 112 can schedule the peer-to-peer download for a later time. For example, if the trusted network endpoint connection is on client computing device 106 through an instant messaging program, but the user of client computing device 106 is not currently online, then download program 112 can schedule the peer-to-peer download for a time when the user of client computing device 106 is online. Once download program 112 makes the connection, download program 112 downloads the requested resource from the peer client computing device (step 230).

In an embodiment, download program 112 can receive a stream of real time information such as a video stream or a Voice-over-Internet Protocol (VoIP) signal from a second client computing device. For example, a user of client computing device 106 is in a coffee shop, watching a live stream of a sports game on client computing device 106. The user of client computing device 110, interested in watching the same sports game, can use download program 112 to download the video stream of the sports game from client computing device 106 to client computing device 110 via peer-to-peer communication.

Figure 3:
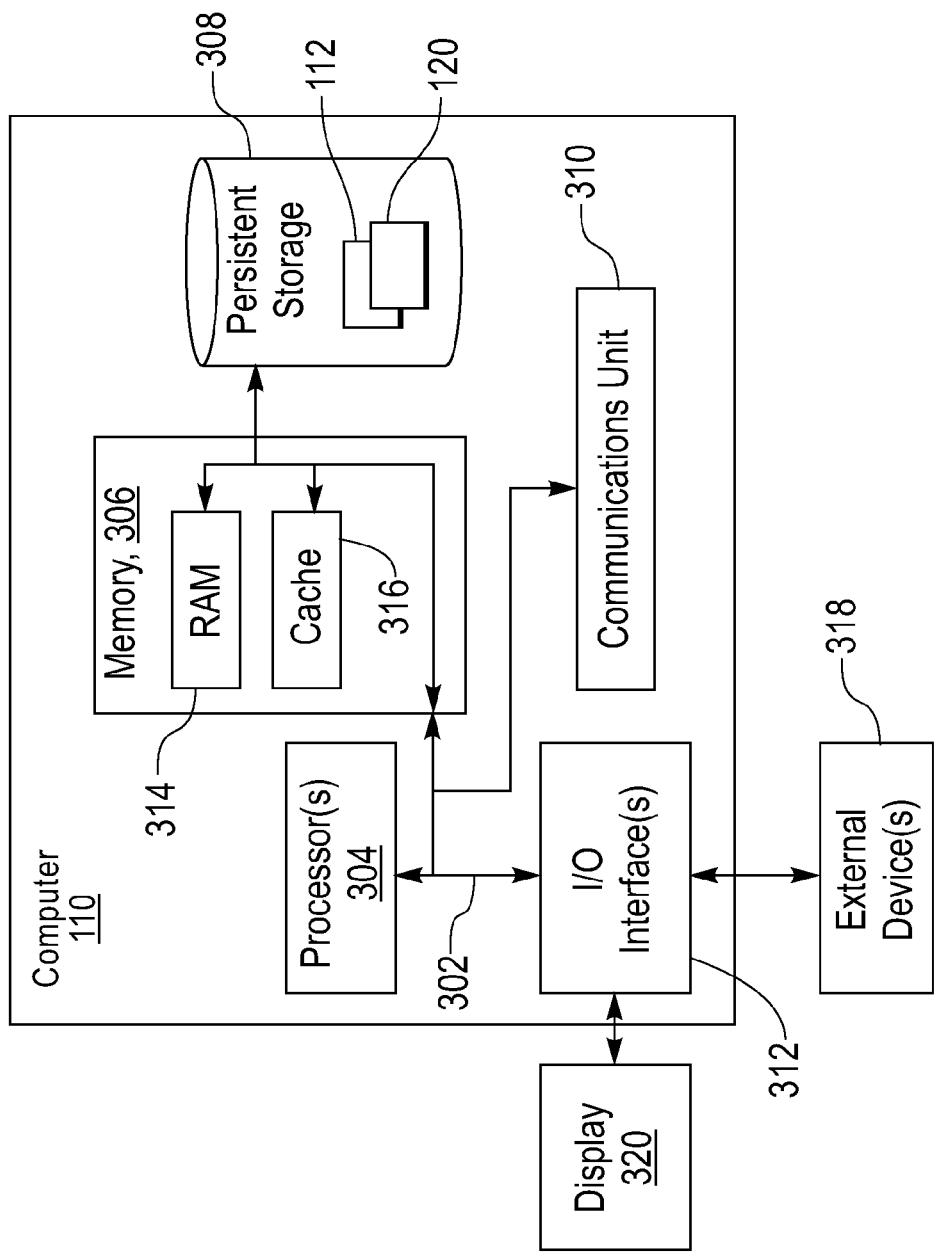
FIG. 3 depicts a block diagram of components of the client computing device executing the download program, in accordance with an embodiment of the present invention.

FIG. 3 depicts a block diagram of components of client computing device 110 executing download program 112, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Client computing device 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM) 314 and cache memory 316. In general, memory 306 can include any suitable volatile or non-volatile computer readable storage media.

Download program 112 and database 120 are stored in persistent storage 308 for execution and/or access by one or more of the respective computer processor(s) 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 can also be removable. For example, a removable hard drive can be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of server computer 104 and client computing devices 106 and 108. In these examples, communications unit 310 includes one or more network interface cards. Communications unit 310 can provide communications through the use of either or both physical and wireless communications links. Download program 112 and database 120 can be downloaded to persistent storage 308 through communications unit 310.

I/O interface(s) 312 allows for input and output of data with other devices that can be connected to client computing device 110. For example, I/O interface(s) 312 can provide a connection to external device(s) 318 such as a keyboard, a keypad, a touch screen, a microphone, a digital camera, and/or some other suitable input device. External device(s) 318 can also include portable computer readable storage media such as, for example, thumb drives, portable optical or magnetic disks, and memory cards. Software and data used to practice embodiments of the present invention, e.g., download program 112 and database 120, can be stored on such portable computer readable storage media and can be loaded onto persistent storage 308 via I/O interface(s) 312. I/O interface(s) 312 also connect to a display 320.

Display 320 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for improving resource downloads, the computer program product comprising:
one or more computer readable storage devices, wherein the one or more computer readable storage devices are not a transitory signal per se, and program instructions stored on the one or more computer readable storage devices, the stored program instructions comprising:
program instructions to detect a request to download a resource from an original source to a user's computing device;
responsive to detecting a request to download a resource from an original source to a user's computing device, program instructions to determine whether the requested resource has been downloaded to the user's computing device in the past;
responsive to determining the requested resource has not been downloaded to the user's computing device in the past, program instructions to determine whether social information associated with the user is available on the user's computing device;
responsive to determining the social information associated with the user is not available on the user's computing device, program instructions to request social information from the user, wherein social information includes at least: a social network identification, a contact information, an organization email address, or a corporate chat identification;
program instructions to determine a cost of the download of the requested resource from the original source, wherein the cost of the download of the requested resource includes at least one of: a measurement of bandwidth or a measurement of time;
program instructions to determine whether the cost of the download of the requested resource from the original source exceeds a predefined threshold;
responsive to determining the cost of the download of the requested resource from the original source exceeds a predefined threshold, program instructions to determine a group of trusted network connected endpoints;
program instructions to determine whether the requested resource exists in the group of trusted network connected endpoints, wherein program instructions to determine whether the requested resource exists in the group of trusted network connected endpoints includes program instructions to propagate a query to a preconfigured depth across a social network of trusted network connected endpoints;
responsive to determining the requested resource exists in the group of trusted network connected endpoints, program instructions to determine whether a peer-to-peer communication path can be established with at least one of the trusted network connected endpoints;
responsive to determining a peer-to-peer communication path can be established with at least one of the trusted network connected endpoints, program instructions to determine one or more endpoints from which the requested resource can be downloaded for a lowest cost; and
program instructions to download the requested resource from at least one of the trusted network connected endpoints.

* * * * *